Dec. 7, 1965    W. R. ATTWOOD    3,221,847
STRUCTURAL CONNECTIONS
Filed April 22, 1963    3 Sheets-Sheet 1
INVENTOR.
WARREN R. ATTWOOD
BY
ATTORNEYS
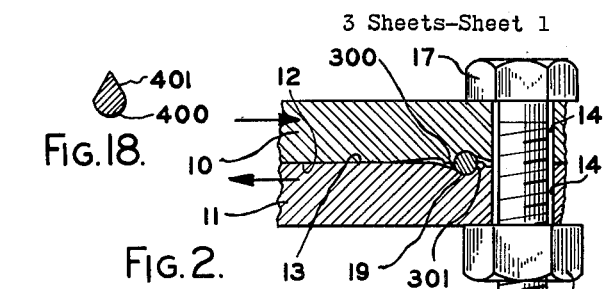
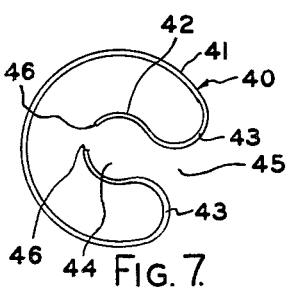
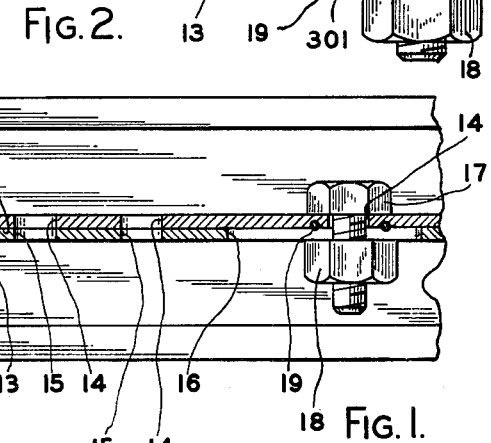
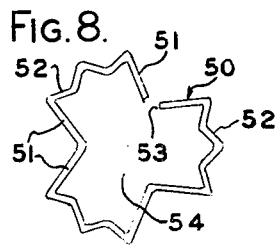
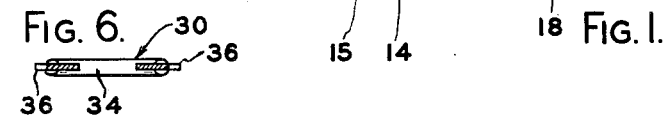
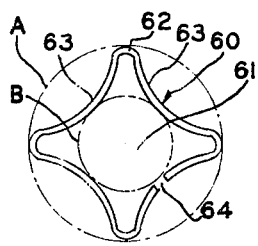
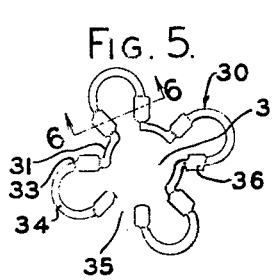
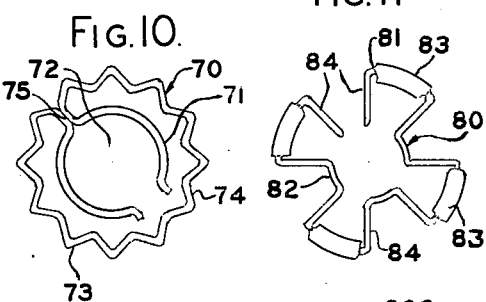
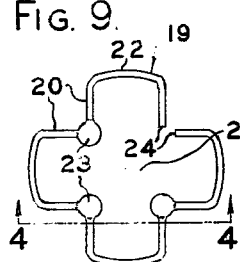
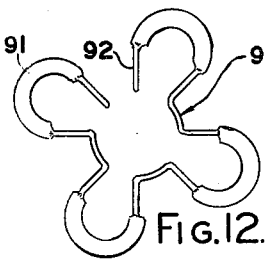
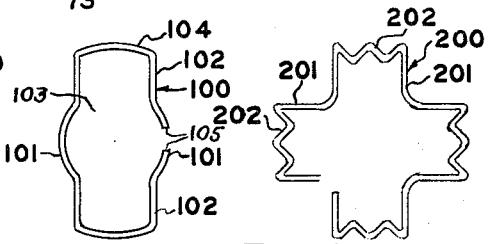
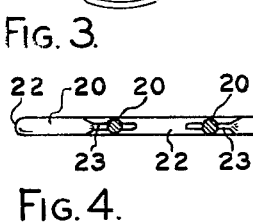

Dec. 7, 1965   W. R. ATTWOOD   3,221,847
STRUCTURAL CONNECTIONS
Filed April 22, 1963   3 Sheets-Sheet 2
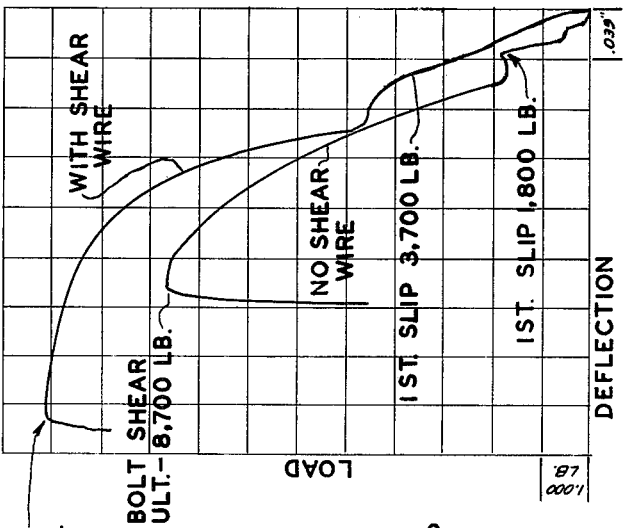
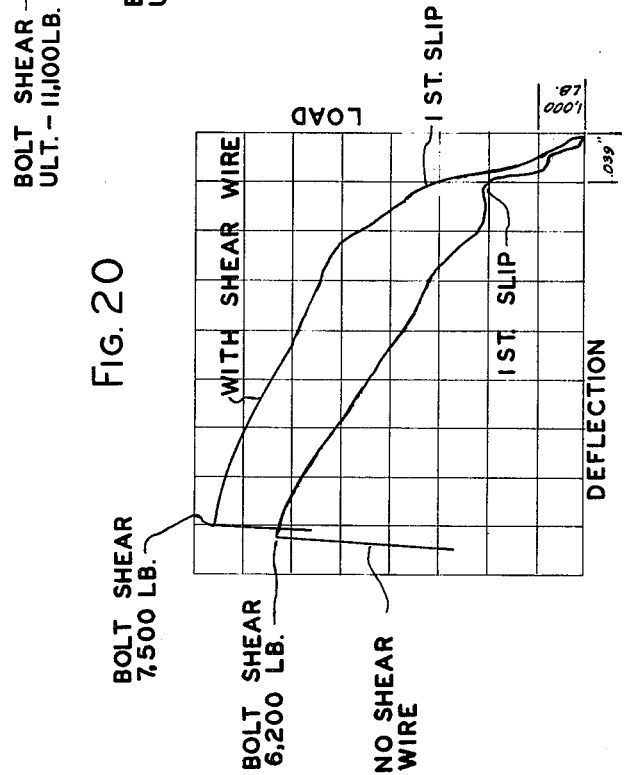
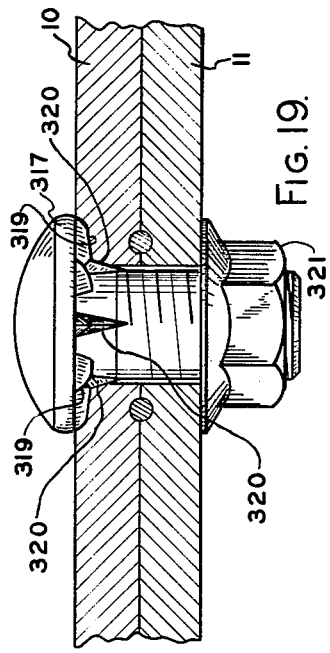
*INVENTOR.*
WARREN R. ATTWOOD
BY
*Hauke & Hauke*
ATTORNEYS Dec. 7, 1965 W. R. ATTWOOD 3,221,847
STRUCTURAL CONNECTIONS
Filed April 22, 1963 3 Sheets-Sheet 3

INVENTOR.
WARREN R. ATTWOOD
BY
Hauke & Hauke
ATTORNEYS 3,221,847
STRUCTURAL CONNECTIONS
Warren R. Attwood, 4077 2nd St., Wayne, Mich.
Filed Apr. 22, 1963, Ser. No. 274,562
7 Claims. (Cl. 189—36)

The present invention relates to structural systems, particularly to an assembly for joining one preferably metallic structural member to another and more particularly to means for locking perforated or slotted structural members against displacement relative to one another and to a bolt, screw or other fastening means used to clamp the members together.

In structural systems presently in use it is sometimes necessary or desirable to provide a slot in at least one of the structural members through which passes a bolt or screw holding the members together. In such a connection as well as when two structural members are joined by fastening means extending through other perforations provided in the structural members, it is difficult to prevent lateral or angular slippage between the members when subjected to stress. The strength of the conventional connection is limited by the shear load of the bolts or other fastening means being used, plus the friction between the surfaces joined. In structures of large size, such as buildings, bridges and the like, a great number of bolts must conventionally be provided to increase the shear resistance and the frictional forces between the surfaces to the desired values preventing rotational displacement of one structural member relative to another. Further, it has not been heretofore possible to produce the unyielding connection between two beam-forming structural members which is necessary to produce the desired resistance to deflection except by welding or using an excessive number of bolts. Such connections are obviously expensive.

It is an object of the present invention to improve connection of one perforated or slotted structural member to another or of a slotted fitting to a perforated member by providing means adapted to be inserted between the joined structural members to resist relative lateral, longitudinal, and angular movement therebetween.

It is yet another object of the present invention to reduce the cost of fabricating structures by providing economical means reducing the number of bolts or other fastening means necessary to produce connections having a desired shear load.

It is yet another object of the present invention to improve the connection of one perforated or slotted structural member to another by providing means resisting torsion stresses which may be produced at the connection.

It is still another object of the present invention to increase the strength of fabricated multi-member structural beams by providing a connection having means improving shear resistance to improve resistance to deflection of the beam.

It is still another object of the present invention to reduce the costs of structure fabrication by providing economically produced connecting elements operable to resist relative movement between connected structural members.

Yet a further object of the invention is to improve metallic structural connections by providing means operable to transfer tension and torsional loads on the connecting element to shear loads on the surfaces of the connected members.

Still further objects and advantages will readily occur to one skilled in the art to which the invention pertains upon reference to the following drawings in which like reference characters referred to like parts throughout the several views and in which FIG. 1 is a cross sectional view illustrating a structural connection utilizing a shear wire of the present invention.

FIG. 2 is an enlarged fragmentary sectional view illustrating the resistance of a shear wire of the present invention to relative displacement of connected structural members.

FIG. 3 is an elevational plan view of a shear wire of the present invention.

FIG. 4 is a cross sectional view as seen substantially from line 4—4 of FIG. 3 and enlarged somewhat for purposes of clarity.

FIG. 5 is an elevational plan view of another preferred shear wire of the present invention.

FIG. 6 is a cross sectional view as seen substantially from line 6—6 of FIG. 5 and enlarged somewhat for purposes of clarity.

FIG. 7 is an elevational plan view of yet another preferred shear wire of the present invention.

FIG. 8 is an elevational plan view of still another preferred shear wire of the present invention.

FIG. 9 is an elevational plan view of yet another preferred shear wire of the present invention.

FIG. 10 is an elevational plan view of still another preferred shear wire of the present invention.

FIG. 11 is an elevational plan view of yet another preferred shear wire of the present invention.

FIG. 12 is an elevational plan view of still another preferred shear wire of the present invention.

FIG. 13 is an elevational plan view of yet another preferred shear wire of the present invention.

FIG. 14 is an elevational plan view of yet another preferred shear wire of the present invention.

FIG. 15 is a view illustrating a preferred lateral cross section configuration of the shear wires of the present invention.

FIG. 16 is a view illustrating another preferred lateral cross section configuration of the shear wires of the present invention.

FIG. 17 is a view illustrating yet another preferred lateral cross sectional configuration of the shear wires of the present invention.

FIG. 18 is a view illustrating still another preferred lateral cross sectional configuration of the shear wires of the present invention.

FIG. 19 is a view similar to FIG. 1 but illustrating a structural connection utilizing a modified bolt member with the shear wire of the present invention, and FIGS. 20 and 21 are graphs comparing the strength of the structural connection with and without the shear wire of the present invention.

Figure 22:
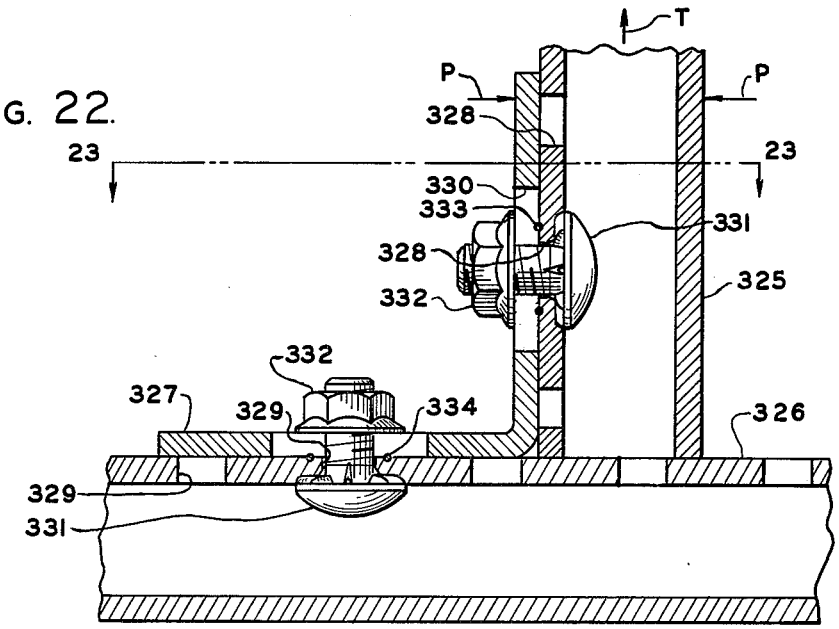
FIG. 22 is a cross sectional view of a structural connection embodying the invention.

Now referring to the drawings for a more detailed description of the present invention, a preferred structural connector assembly is illustrated in FIG. 1 as preferably comprising a pair of metallic (preferably steel) structural members 10–11. The structural members 10–11 are provided with longitudinal flat surfaces 12–13 respectively. The flat surface 12 of the structural member 10 is preferably provided with a plurality of spaced perforations 14. The flat surface 13 of the structural member 11 is illustrated for purposes of convenience provided with a plurality of spaced perforations 15 and an elongated slot 16. In actual practice, connections might be made between members and fittings having all kinds of holes, slots, or the like. Threaded bolts 17 are respectively inserted through a pair of perforations 14–15 and through a perforation 14 of the structural member 10 and the elongated slot 16 of the structural member 11. Each of the bolts 17 carries a nut 18 so that tightening the bolts 17 and nuts 18 clamps the surfaces 12–13 together. A shear wire 19 which will be described in greater detail below is carried intermediate the surfaces 12–13 in a position closely adjacent and substantially encompassing the shanks of the bolts 17. The shear wires 19 are of such harder material and greater tensile strength than the surfaces 12–13 that tightening the bolts 17 and nuts 18 will embed the shear wires 19 into the surfaces 12–13.

FIGS. 3–14 illustrate a few of the many possible configurations of the shear wires of the present invention.

FIGS. 3–4 illustrate a preferred shear wire 19 of the present invention as comprising a plurality of straight portions 20 extending outwardly from an open center 21. The straight portions 20 are connected in pairs at their outward ends by arcuate portions 22 and at their inward ends by flat portions 23. A pair of the straight portions 20 are left unconnected to provide a pair of spaced ends 24.

Another preferred shear wire 30 is illustrated in FIGS. 5–6 as comprising a plurality of arcuate portions 31 which define a substantially circular open center 32. The ends of the arcuate portions 31 are each integrally connected with a straight portion 33 extending substantially radially outwardly from the center 32. Semi-circular portions 34 integrally connect the outwardly disposed ends of the straight portions 33 in pairs. A pair of adjacent straight portions 33 are preferably left unconnected to form a gap 35. The straight portions 33 are each preferably provided with a flat medial portion 36.

Still another preferred shear wire 40 of the present invention is illustrated in FIG. 7 as comprising a pair of radially spaced arcuate portions 41–42. The portions 41 and 42 are integrally connected to each other at each end by curved portions 43. The arcuate portion 42 defines an open center 44 and the curved portions 43 are spaced to define a gap 45. A portion is removed from the arcuate portion 42 to provide a pair of spaced ends 46.

FIG. 8 illustrates yet another preferred shear wire 50 of the present invention. A plurality of angularly outwardly extending straight portions 51 are integrally connected in pairs at their innermost ends. Alternate pairs of straight portions 51 are connected at their outermost ends by portions 52 which are preferably in the form of a pair of integrally connected W-shaped wires as shown. A pair of adjacent straight portions 51 are preferably left unconnected to form a gap 53 and the straight portions are sufficiently spaced to provide an open center 54.

FIG. 9 illustrates still another preferred shear wire 60 of the present invention as comprising a substantially open center 61 and a plurality of arcuate portions 62 equally spaced from the center 61 and each formed on a common radius. The arcuate portions 62 are integrally connected in pairs by curved portions 63. As is apparent from the drawing, the curved portions 63 are formed on equal radii and from centers equally spaced from the center 61. One of the curved portions 63 is preferably broken to form a gap 64.

FIG. 10 illustrates still another preferred shear wire 70 of the present invention as comprising an inner arcuate portion 71 which defines an open center 72. An outer portion 73 is radially outwardly spaced from and is integrally connected with the arcuate portion 71 and comprises a plurality of connected V-shaped portions 74. The arcuate portion 71 is formed as shown to provide a parting line 75 between two portions 74 preferably broken to form a pair of spaced ends 75.

FIG. 11 illustrates another preferred shear wire 80 which is substantially similar to the shear wire 30 shown in FIGS. 5–6 except outer arcuate portions 81 are provided which are substantially concentric to inner arcuate portions 82 and are flattened as at 83. Straight portions 84 are of a uniform cross sectional area throughout their length.

FIG. 12 illustrates still another preferred shear wire 90 substantially similar to the shear wire 30 shown in FIGS. 5–6 except that the outer semi-circular portions 91 are flattened instead of the straight portions 92.

FIG. 13 illustrates yet another preferred shear wire 100 of the present invention as comprising inner arcuate portions 101 spaced to define an open center 103 and joined at their ends by outwardly extending straight portions 102 and a connecting outer arcuate portion 104 which are substantially concentric to the inner arcuate portions 101. The ends 105 of the wire are preferably spaced as shown to provide a gap.

FIG. 14 illustrates another preferred shear wire 200 of the present invention which is substantially similar to the shear wire 19 shown in FIGS. 3–4 without the flat portions and except that the outwardly extending straight portions 201 are connected by W-shaped portions 202 substantially similar to those shown in FIG. 8.

Although various configurations of the shear wire of the present invention have been illustrated, it is not intended that the present invention be limited to those illustrated and described since many other configurations can be devised which would satisfy the requirements of the present invention.

Although each of the shear wires shown in FIGS. 3–14 differs in some respects from the others illustrated, there are certain characteristics which are common to all. Each is formed entirely within a pair of substantially concentric circles A and B as illustrated with respect to one of the shear wires 60 in FIG. 9. The diameters of the circles A and B are of sufficient values to provide a shear wire in which the innermost portions are spaced outwardly so as to substantially encompass the shank of the bolt 17 and the outermost portions of the shear wire lie beneath the head of the bolt and the nut so that the required force to embed the shear wire will be effectively transmitted upon tightening the bolt 17 and nut 18.

Each shear wire is constructed of a preferably resilient material harder and stronger than the material of the structural members 10–11 and is provided with a gap or parting line which permits the shear wire to be snapped over the shank of the bolt 17 at any time in the assembly. Each of the shear wires is provided with one or more portions which in combination, when the wire is embedded into the structural member, will resist stresses in any direction or directions tending to produce slippage of the members on the plane of their connected surfaces. Tendencies of the operative portions of the shear wire to roll are effectively resisted by having these portions connected together by other portions of the wire.

Flattened portions are provided on some of the shear wires to facilitate embedding upon tightening of the bolt 17 and nut 18. These flattened portions are provided generally in areas of the shear wires which contribute little to the resistance produced by the shear wire. It is apparent that in connections where either torsion stresses or shear loads are not great, the portions of the shear wires otherwise designed to cross the direction of such forces can be flattened. The different shapes shown provide a selection of wires whose shear resistance formation will be adaptable to a large variety of construction jobs. Where resistance is not needed, the wire is flattened to make it easier to embed those portions of the wires which are needed for resistance, but yet retaining connection between the operative portions.

FIG. 2 illustrates diagrammatically how the shear wire 19 of the present invention resists relative displacement of the structural members 10–11 after the wire has been embedded in the connected surfaces 12–13 of these members. The arrows indicate the stresses which would ordinarily shear the bolt 17. The shear wire 19 being harder and stronger than the surfaces 12–13 will tend to gouge the material at the surface, piling it up as shown at 300 and 301. This has the result that the gouged out material impedes further slippage between the structural members to cause an increased resistance as a slight amount of displacement is substantially reduced after initial frictional resistance has been overcome.

In effect the use of a shear wire of the present invention produces a connection in which the clamping forces on the bolt are transferred to the shear wire, and thence as forces resisting shear between surfaces of the connected members. This produces a connection in which, with a given number of bolts torqued to a given degree, it is possible to achieve a greater shear resistance than has heretofore been possible. Moreover, where two bolts might heretofore be necessary to resist torsional stresses, a single bolt plus the present shear wire can be used since the wire resists angular shear forces as well as straight shear.

The shear wire of the present invention resists initial slip between connected structural members and also produces an increased resistance to further displacement.

In a bolted connection without the present shear wire, the holes in the members are necessarily of larger diameter than the bolt shank, so that only bolt tension and friction between the two surfaces are resisting the initial slippage before the edge of the holes engage the bolt shank.

It has been found that the use of shear wires of the present invention with a plurality of bolts to join a pair of longitudinally extending structural members in a beam produces, because of the shaft in the neutral axis from the individual axes of each of the structural members to an axis close to the plane of connection, a greater resistance to deflection of the total beam than would otherwise be permitted if the members slipped relative to one another. Heretofore such a resistance was not possible to achieve to a desirable extent except by using many welded connections, or a very great number of bolts, rivets or the like.

FIGS. 15–18 illustrate preferred cross-sectional configurations of the shear wires of the present invention. FIG. 15 illustrates a circular cross-sectional configuration. FIGS. 16–17 illustrate diamond shaped configurations which are especially suitable for use with structural members of a relatively hard material. FIG. 18 illustrates a preferred cross sectional configuration having a rounded surface 400 and a triangular surface 401. This configuration is especially suitable when it is desired to connect a relatively hard material with a relatively soft material.

Although it has been preferred to illustrate the use of the shear wires of the present invention with an ordinary bolt 17 and nut 18, it has been found that if the bolt 17 and nut 18 are coated with wax or otherwise treated to reduce friction and thus make more efficient use of torque applied to the bolt and nut, better results are produced since the shear wires will then much more readily be embedded in the surface of the structural members. Also, it has been found that better results can be achieved by using the shear wires of the present invention in combination with bolts having inclined teeth which bite into the surface of the structural member like those described in my copending application Ser. No. 669,027, filed July 1, 1957.

Such a connection is illustrated in FIG. 19. As shown, a bolt 317 is provided with symmetrical radial teeth 319 and inclined teeth 320. The teeth 319 and 320 are of a material harder and stronger than that of the structural members 10–11 so that upon tightening the nut 321 the teeth will be forced into the upper surface of the member 10 and the edge of the hole to resist relative displacement between the bolt 317 and the structural member 10.

Figure 23:
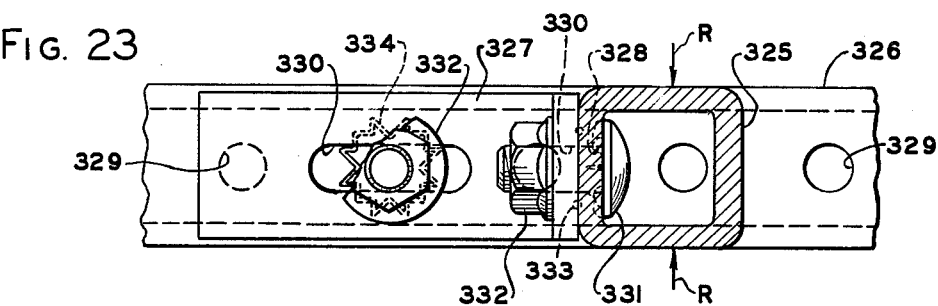
FIG. 23 is a cross sectional view taken on the line 23—23 of FIG. 22.

A highly successful use for the present shear wire is found in structures requiring connection of members with fittings, in the manner illustrated in FIGS. 22, 23. One preferably tubular structural member 325 is butt-joined to a second preferably tubular member 326 by an angle fitting 327. The members 325, 326 are provided with perforations 328, 329 respectively. The fitting 327 has slots 330 through which and the perforations 328, 329 extend bolts 331 having nuts 332 threadedly engaged on the fitting sides. Shear wires 333, 334 are disposed intermediate the surfaces of the fitting 327 and the members 325, 326 and are embedded on tightening of the nuts 332.

It will be apparent that, in addition to conventional resistances of the connection, assuming member 326 to be fixed, longitudinal tension stresses on the member 325 indicated by the arrow T in FIG. 22 will be opposed by longitudinally planar resistance of the shear wire 333, and pressure on the member 325 in either direction indicated by the arrows P in FIG. 22 will be opposed longitudinally planar resistance of the shear wire 334. Most important, pressure on the member 325 in either direction indicated by the arrows R of FIG. 23 will be opposed by angular planar resistance of the shear wire 334. This latter resistance is almost impossible to achieve through surface friction between fitting 327 and member 326 because clamping pressures can never be of the degree operable to resist the torquing leverage which can be exerted from the member 325 in normal usage.

Figure 24:
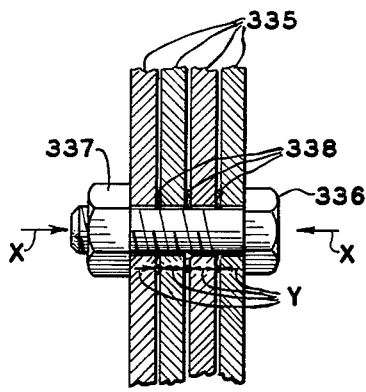
FIG. 24 is a fragmentary cross-sectional view of another embodiment of the invention.

Another advantage of the present shear wire is found where multiple members 335 as in FIG. 24 are joined together by means of a bolt 336 and nut 337. Shear wires 338 disposed intermediate the surfaces of adjacent members 325 will all be embedded by compressive forces X exerted by the nut and bolt on tightening. Moreover, if the members 335 are of the same material, which is usually the case, the embedding forces Y on each of the shear wires will be equally transmitted by and through the members 325.

The increased load capabilities of a structural connection utilizing a shear wire of the present invention are readily apparent from an examination of the graphs illustrated in FIGS. 20–21. The graphs are the results of actual tests conducted upon structural connections with and without the shear wires of the present invention. A Baldwin testing machine was used in conducting these tests.

To conduct the test, results of which are shown in FIG. 20, a flat plate fitting 2″ x 1⅝″ x ¼″ in size, punch press formed from hot rolled pickled and oiled plate steel, having a 7/16″ x 1″ slot was secured to a structural member having a 7/16″ diameter perforation with a ⅜″ wax treated bolt like the one shown in FIG. 19 torqued to 30 ft. lb. A .020″ diameter stainless steel shear wire like the one shown in FIG. 14 and ¾″ wide was inserted between the surfaces of one of such test assemblies.

The test without the shear wire indicates that significant initial slippage occurred at about 2100 lb. load, after which the end of the slot engaged the bolt shank and further load was resisted solely by the bolt, which finally sheared at about 6200 lb. load.

With the shear wire on the other hand, initial slippage at about 3200 lb. load was practically unnoticeable in terms of deflection, after which the shear wire contributed to the natural resistance of the bolt, which finally sheared at about 7500 lb. load.

Thus the use of the shear wire not only increased resistance to initial slippage, i.e. the overcoming of inertial friction between the parts, but also continued to resist shearing forces, adding this to the shear strength of the bolt. A bolt alone, to produce equal resistance would have to be very much larger and would be far more expensive than the smaller bolt plus shear wire.

In the other test, results of which are shown in FIG. 21, a ¼″ thick flat plate fitting, punch press formed from hot rolled pickled and oiled plate steel 1⅝″ square having a 7/16″ diameter center hole was secured to the same type of member as in the FIG. 20 test, with the same type of nut and bolt, and with the same type of shear wire in one assembly.

Without the shear wire, a decided initial slippage occurred at about 1800 lb. load, after which the edge of the hole engaged with the bolt shank and resisted further load until the bolt sheared at about 8700 lb. load.

With the shear wire, initial slippage occurred at about 3700 lb. load but deflection occurred smoothly and slowly until the edge of the hole engaged with the bolt at about 4700 lb. load, after which the combined resistance kept the bolt from shearing until about 11,100 lb. load had been applied.

Thus the use of the shear wire produced connections capable of taking 52 and 105 percent more applied load before the initial slippage occurred, and of taking 20 and 27 percent more load before the bolts sheared.

In large structures such as bridge and roof spans, it will be noted that increasing resistance to initial slippage is a vital factor, since very slight slippages at a multiplicity of joints can produce an overall deflection or sag of considerable magnitude even though the load safety factor is never exceeded.

Although I have described several embodiments of the present invention, it is apparent that many changes and modifications can be made without departing from the spirit of the invention or the scope of the appended claims.

I claim:

1. Means locking one structural member to another, said means comprising
  (a) fastening means operable upon tightening to clamp said structural members one to the other, and
  (b) an elongated bent wire member of a material harder and stronger than each of said structural members carried between said structural members and substantially completely encircling said fastening means, said wire member embedding into each of said structural members as said fastening means is tightened, said wire member then resisting shear forces between said structural members in any direction in the plane of said wire member.

2. Means locking one structural member to another, said means comprising
  (a) a bolt and a nut carried by said structural members and operable upon tightening to clamp said structural members one to the other,
  (b) a resilient wire of a material harder and stronger than each of said structural members formed into a substantially annular shape, said wire being carried intermediate said structural members encircling the shank of said bolt, said wire embedding itself into each of said structural members along its entire length as said bolt and nut are tightened, said wire then resisting shear forces between said structural members in any direction in the plane of said wire.

3. Means locking one structural member to another, said means comprising
  (a) a bolt and a nut carried by said structural members and operable upon tightening to clamp said structural members one to the other,
  (b) a resilient wire of a material harder and stronger than each of said structural members formed into a substantially annular shape with a gap at least at one point along the periphery thereof, the width of said gap being less than the diameter of the shank of said bolt, said wire being introduced about said shank by snapping it in place such that said wire encircles said shank, said wire embedding itself into each of said structural members as said bolt and nut are tightened.

4. Means locking one structural member to another, said means comprising
  (a) a bolt and a nut carried by said structural members and operable upon tightening to clamp said structural members one to the other,
  (b) a wire of a material harder and stronger than each of said structural members formed into a substantially circular shape, said wire having an outer portion extending along an outer circle and an inner portion extending along a concentric inner circle, said wire having a gap along its periphery extending to the center of said circles, said wire being introduced intermediate said structural members and encircling the shank of said bolt, said inner portion encompassing the shank of said bolt and said outer portion extending beneath the head of said bolt, said wire embedding itself into each of said structural members as said bolt and nut are tightened.

5. The locking means as set forth in claim 4 and wherein the width of said gap is less than the diameter of said shank and said wire is snapped in place about said shank.

6. Means locking one structural member to another, said means comprising
  (a) a bolt and a nut carried by said structural members and operable upon tightening to clamp said structural members one to the other,
  (b) a wire of a material harder and stronger than each of said structural members formed into a substantially annular shape, said wire being carried intermediate said structural members encircling the shank of said bolt, said wire embedding itself into each of said structural members along its entire length as said bolt and nut are tightened, the opposing surfaces of said structural members contacting immediately adjacent to said embedded wire, shear and torsional loads applied to said structural members being thereby transferred from said bolt and nut to said contacting surfaces on said structural members.

7. Means locking one structural member to another, said means comprising
  (a) a bolt and a nut carried by said structural members and operable upon tightening to clamp said structural members one to the other,
  (b) a wire of a material harder and stronger than each of said structural members formed into a substantially annular shape with a gap at least at one point along the periphery thereof, the width of said gap being less than the diameter of the shank of said bolt, said wire being introduced about said shank by snapping it in place such that said wire encircles said shank, said wire embedding itself into each of said structural members along its entire length as said bolt and nut are tightened, the opposing surfaces of said structural members contacting immediately adjacent to said embedded wire, shear and torsional loads being thereby transferred from said bolt and nut to said contacting surfaces on said structural members.

References Cited by the Examiner
UNITED STATES PATENTS

| | | | |
|---|---|---|---|
| 409,546 | 8/1889 | Zeigler | 85—11 X |
| 1,289,147 | 12/1918 | Forssell | 85—11 X |
| 1,426,232 | 8/1922 | Theodorsen | 85—11 X |
| 1,969,796 | 8/1934 | Hoke | 189—36 X |
| 2,444,276 | 6/1948 | Aldrich | 189—36 |

RICHARD W. COOKE, JR., *Primary Examiner.*